United States Patent
Antonio et al.

(10) Patent No.: US 6,788,488 B2
(45) Date of Patent: Sep. 7, 2004

(54) VARIABLE MODE MULTI-MEDIA DATA OBJECT STORAGE DEVICE

(75) Inventors: Franklin P. Antonio, Del Mar, CA (US); Sanjay Jha, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 453 days.

(21) Appl. No.: 09/864,584

(22) Filed: May 24, 2001

(65) Prior Publication Data

US 2002/0097515 A1 Jul. 25, 2002

Related U.S. Application Data

(60) Provisional application No. 60/263,476, filed on Jan. 22, 2001.

(51) Int. Cl.[7] .............................................. G11B 15/46
(52) U.S. Cl. .................................................. 360/73.03
(58) Field of Search ............................ 360/73.03, 62, 360/63; 386/45, 125–126

(56) References Cited

U.S. PATENT DOCUMENTS

| | | | | |
|---|---|---|---|---|
| 5,420,690 A | * | 5/1995 | Koishi ......................... | 358/342 |
| 5,610,808 A | * | 3/1997 | Squires et al. .............. | 364/131 |
| 5,801,740 A | * | 9/1998 | Isono et al. .................. | 347/129 |
| 6,115,337 A | | 9/2000 | Takagi et al. | |
| 6,292,317 B1 | * | 9/2001 | Alexander .................... | 360/31 |
| 6,304,405 B1 | * | 10/2001 | Asano et al. ............ | 360/73.03 |
| 6,519,104 B1 | * | 2/2003 | Cloke et al. ................... | 360/51 |
| 2001/0000444 A1 | * | 4/2001 | O'Connor ...................... | 360/31 |
| 2002/0105872 A1 | * | 8/2002 | Sasaki et al. ............. | 369/47.39 |
| 2003/0026030 A1 | * | 2/2003 | Koizumi et al. .............. | 360/69 |

FOREIGN PATENT DOCUMENTS

| | | |
|---|---|---|
| DE | 4218420 | 8/1993 |

OTHER PUBLICATIONS

Patent Abstract of Japan, vol. 015, No. 264 (p–1370).

* cited by examiner

*Primary Examiner*—David Hudspeth
*Assistant Examiner*—Mitchell Slavitt
(74) *Attorney, Agent, or Firm*—Philip Wadsworth; Sandip (Micky) Minhas; Albert J. Harnois, Jr.

(57) ABSTRACT

A method and apparatus for a variable mode multi-media data object storage device. Large digital objects can be quickly downloaded in approximately a minute. The digital objects can be utilized or played back at real-time speeds. Utilization or playback consumes minimal power, allowing the disk to support portable devices operating on battery power. The storage device uses multiple disk rotation speeds to support multiple modes of operation. The storage device operates in at least two modes of disk drive operation, supporting a fast platter rotation speed for writing and a slower platter rotation speed for reading. The multiple rotation speeds operate in conjunction with a head assembly configured with at least one head for reading and multiple heads for writing. When writing, the disk spins at the faster rotation speed. When in utilization or playback mode, the disk spins at the slower, power conserving rotation speed.

63 Claims, 5 Drawing Sheets

VARIABLE MODE MULTI-MEDIA DATA OBJECT STORAGE DEVICE

CROSS REFERENCE

This application claims priority from Provisional Application No. 60/263,476, filed Jan. 22, 2001, entitled "Fast Write/Slow Read Magnetic Disk Drive."

BACKGROUND

1. Field

The presently disclosed embodiments relate generally to the field of disk drives, and more specifically to a disk drive for storing multi-media data objects.

2. Background

There is a growing demand for storage of multi-media data objects such as movies, music, games, books, texts, graphics, and interactive programming. Known devices for storing large multi-media data objects comprise disk drives designed to read and write at the same speed. Disk drives that read and write at the same speed were designed for computer applications, where it is important to both read and write quickly, and where each disk access operation has an equal probability of being a read operation or a write operation. Requirements for multi-media object storage and retrieval are different than requirements for storing computer applications.

The use of a standard disk drive, in storing video for example, renders disk drive access that is faster than necessary when reading, and slower than necessary when writing. Because the disk platter spins faster than necessary when performing read operations for video playback, the disk drive consumes more power than necessary during video playback. For portable video playback devices, it is desirable to reduce power consumption during playback, requiring the disk to spin just fast enough so that data is produced at a rate required to drive a real-time video or multimedia stream. A typical rate for driving a real-time video or multi-media stream could be 5 Megabits per second (Mb/s). A disk drive operating at 5 Mb/s does not allow writing at a desired rate for storing large multi-media data objects in a short period of time. A desired write speed for storing a large multi-media data object in a few minutes could be 250 Mb/s, or approximately 50 times faster than the desired speed for reading.

Disk drives known in the art spin at one constant speed. Common speeds are 5400 revolutions per minute (rpm), 7200 rpm, 10,000 rpm and 15,000 rpm. Very small disk drives may spin slower, at approximately 3600 rpm. Thus, there is a need in the art for a disk drive with multiple modes of operation to provide individually selectable read and write speeds for storing and retrieving multi-media data objects.

SUMMARY

Embodiments disclosed herein address the above-stated needs by providing a variable mode multi-media data object storage device with at least two modes of disk drive operation supporting different platter rotation speeds and head configurations for reading and writing.

Accordingly, in one aspect of the invention, a storage device includes a disk drive configured to operate at either a first rotation speed or a second rotation speed, and a processor coupled to the disk drive and configured to control the disk drive to operate at either the first rotation speed or the second rotation speed.

In another aspect, a disk drive for storing multi-media data objects includes a magnetic disk, at least one individually selectable disk speed for reading, at least one individually selectable disk speed for writing, wherein the disk speed for writing is faster than the disk speed for reading, a plurality of write heads for writing multi-media object data to the disk, and one read head for reading multi-media object data from the disk.

In another aspect, a variable mode disk drive for storing multi-media data objects operating in at least one read mode and at least one write mode includes a bus interface for providing input data to a buffer while the disk drive operates in a write mode, and for transferring output data from the buffer while the disk drive operates in a read mode, a slider mechanism for positioning one read head and a plurality of write heads over a magnetic disk, read and write electronics for processing data for transfer to and from the magnetic disk, and a processor for controlling the rotation speed of the magnetic disk.

In another aspect, a method for storing data on a disk drive includes configuring the disk drive to operate at a first rotation speed for reading, and configuring the disk drive to operate at a second rotation speed for writing, wherein the rotation speed for writing is faster than the rotation speed for reading.

In another aspect, a method for storing data to a disk drive having at least one disk speed for reading and at least one disk speed for writing, wherein the speed for writing is faster than the speed for reading, includes receiving data from a bus interface, processing the received data for simultaneous writing to the disk by a plurality of write heads, rotating the disk drive at the faster speed for writing, and writing the processed data to the disk by simultaneously using a plurality of write heads.

In yet another aspect, a method for retrieving data from a disk drive having at least one disk speed for reading and at least one disk speed for writing, wherein the speed for writing is faster than the speed for reading, includes rotating the disk drive at the slower speed for reading, reading data from the disk drive, processing the data to create a multi-media data stream, and providing the data stream to a bus interface.

DETAILED DESCRIPTION

The disclosed embodiments provide a method and apparatus for a variable mode multi-media data object storage device. The variable mode multi-media data object storage device stores movies, music, games, books, texts, graphics, interactive programming, or other large digital objects. Large digital objects, such as movies, can be quickly downloaded in approximately a minute. The digital objects can be utilized or played back at real-time speeds. Utilization or playback consumes minimal power, allowing the disk to support portable devices operating on battery power. The variable mode multi-media data object storage device is expected to spend the majority of its time operating at utilization or playback speeds.

Because it is not necessary for the storage device to be ready to perform arbitrary operations, such as random access disk drives must be ready to perform in a computer, the storage device can use multiple disk, or platter, rotation speeds to support multiple modes of operation. To provide rapid download and real-time utilization, the storage device operates in at least two modes of disk drive operation, supporting a fast platter rotation speed for writing and a slower platter rotation speed for reading. The multiple rotation speeds operate in conjunction with a head assembly configured with at least one head for reading and multiple heads for writing. When the storage device operates in write mode, the disk drive spins at the faster rotation speed. When the storage device is in utilization or playback mode, the disk drive spins at the slower, power conserving, rotation speed. The disk drive of the storage device is commanded into fast or slow speed by a processor or computer coupled to the disk drive.

Figure 1:
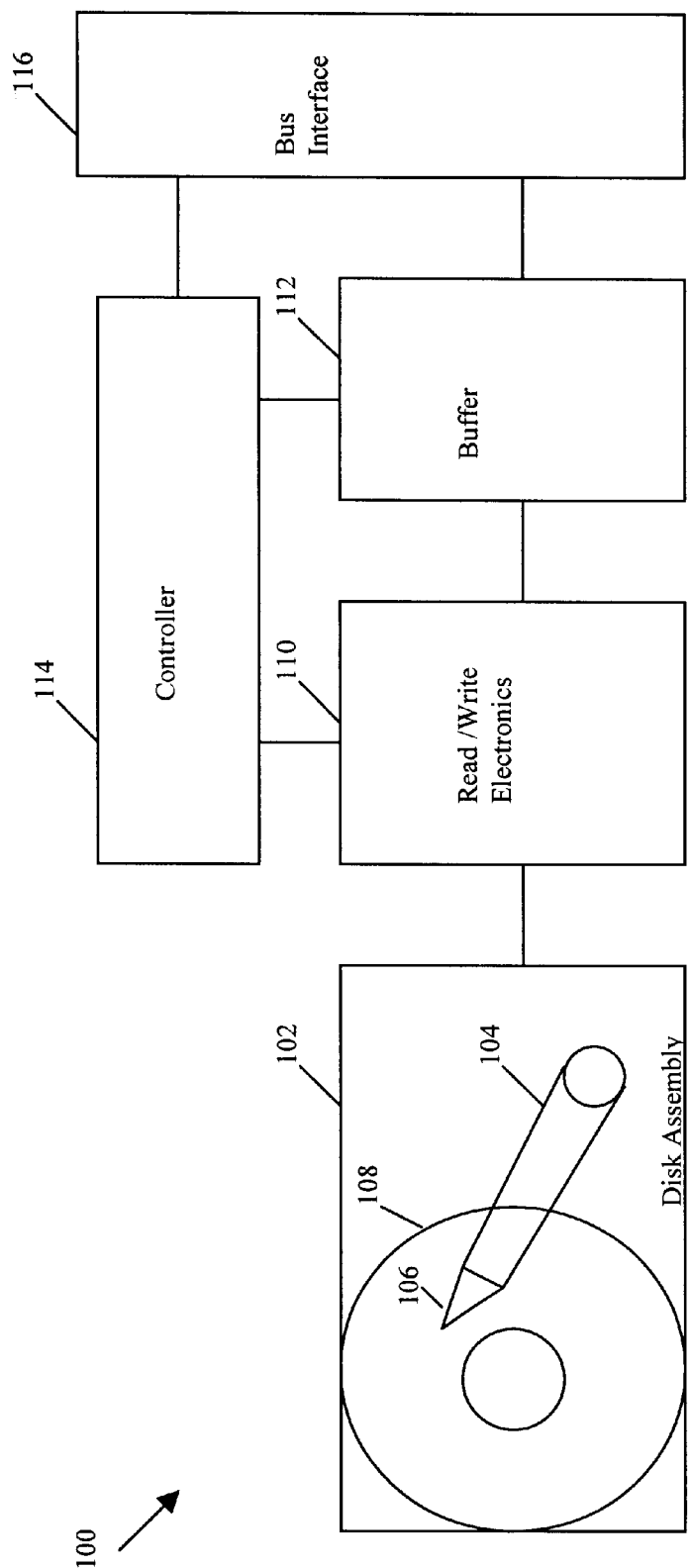
FIG. 1 is a block diagram of an exemplary embodiment of a variable mode multi-media data object storage device.

FIG. 1 illustrates a block diagram of an exemplary embodiment of a variable mode multi-media data object storage device. A Bus Interface 116 provides input data to a buffer 112 in write mode, and transfers output data from the buffer 112 in read mode. The Bus Interface 116 may be a Personal Computer Memory Card International Association (PCMCIA) bus interface, an Advanced Technology (AT) bus interface, a Small Computer System Interface (SCSI) bus interface, a Universal Serial Bus (USB) bus interface, an Interactive Services Association (ISA) bus interface, a Firewire bus interface, a Peripheral Component Interconnect (PCI) bus interface, or any bus interface for transferring digital data between components of a digital device.

In write mode, input data is transferred to buffer 112 from the Bus Interface 116 and processed to create signals for encoding on a disk 108 by Read/Write electronics 110. The input data may also be formatted by Read/Write electronics 110 to facilitate simultaneous transfer of the data to the disk 108 by multiple write heads of a head assembly 106. Input signals created by Read/Write electronics 110 are provided to disk assembly 102. Disk assembly 102 comprises a slider mechanism 104 for positioning head assembly 106 to write the processed input data to disk 108. Disk 108 can have capacity in the range of a small disk drive, from 1 Gigibyte (GB) to 10 GB.

In read mode, output data signals are decoded from disk 108 by the head assembly 106, positioned for reading by slider mechanism 104. Read/write electronics 110 process the decoded signals to create output data. The output data may also be formatted by Read/Write electronics 110 to re-assemble data simultaneously transferred to the disk 108 by multiple write heads of head assembly 106. Output data is provided by Read/Write electronics 110 to buffer 112 for transfer to Bus Interface 116.

Controller 114 is coupled to Read/Write electronics 110, buffer 112, and Bus Interface 116. Controller 114 controls write and read mode operations. Disk 108 is commanded by controller 114 to operate at a fast speed for write operations and a slower speed for read operations. The disk 108 may be commanded by the controller 114 to operate at multiple read and multiple write speeds depending on the type of multimedia data object. In an exemplary embodiment, the slow speed may be on the order of 1000 rpm, and the fast speed on the order of 7000 rpm.

One skilled in the art would recognize that the controller 114 may be implemented using field-programmable gate arrays (FPGAs), programmable logic devices (PLDs), digital signal processors (DSPs), one or more microprocessors, an application specific integrated circuit (ASIC), or any other device capable of performing the controller functions described above. One skilled in the art would also understand that buffer 112 may be optionally omitted without departing from the scope of the disclosed embodiments.

Figure 2:
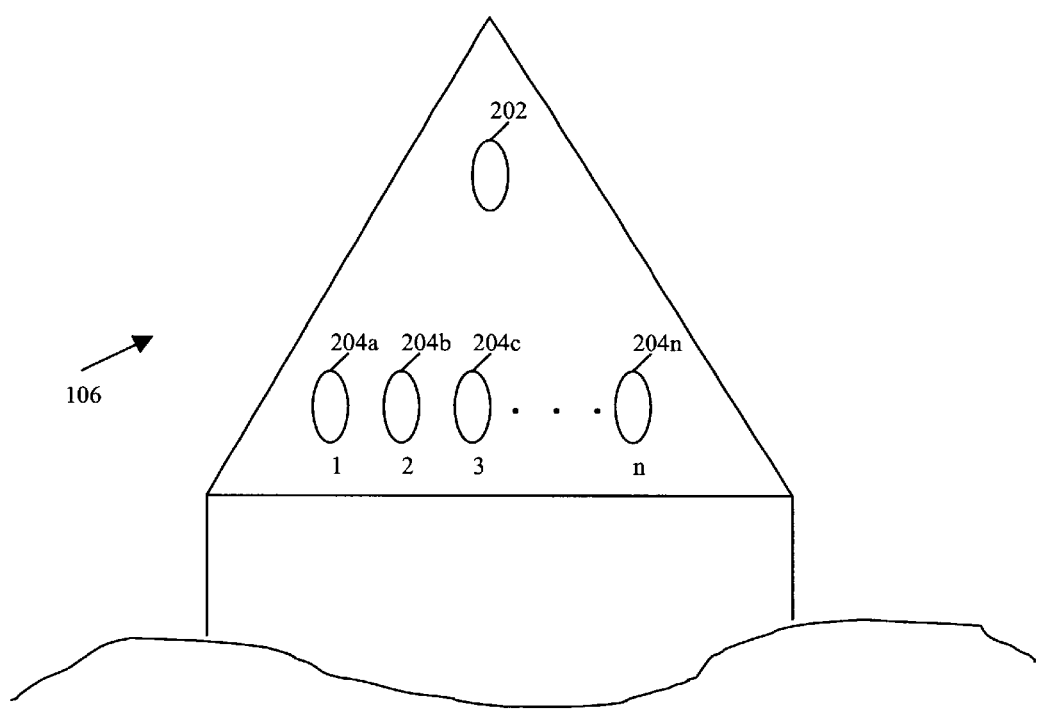
FIG. 2 illustrates an exemplary embodiment of a read/write head configuration that could be used in the multi-media data object storage device detailed in FIG. 1.

FIG. 2 details an exemplary embodiment of the head assembly 106 illustrated in FIG. 1. Conventionally, read and write operations have used a different magnetic head. The write head is typically inductive, and the read head is typically magnetoresistive. Because the read and write heads are separate, they can be optimized by the disclosed embodiments for different rotation speeds.

The slider mechanism 104 on which the head 106 resides flies above the magnetic disk surface 108. The height of the slider mechanism is a function of the speed at which the disk surface 108 is moving under the head 106, or the platter rotation speed. The faster the disk 108 spins, the more aerodynamic pressure is created, which forces the head 106 higher above the disk 108. The disk 108 must not spin so fast as to push the head 106 far enough away from the surface of the disk 108 to magnetically uncouple the head 108 from the surface of the disk 108 (e.g. the magnetic field is too weak at the distance of the head 106 from the surface 108 that the head 106 cannot read or write data). This flying height limits the acceptable ratio of write speed to read speed. To overcome such flying height limits, the disclosed embodiments employ a plurality of write heads 106.

The head assembly 106 of the disclosed embodiments contain one read head and multiple write heads. When writing, the disk 108 spins at a high write speed, and multiple write heads are employed. When reading, the disk 108 spins at a lower read speed, and one write head is employed. In an exemplary embodiment with a write speed of 7000 rpm and a read speed of 1000 rpm, the ratio of write speed to read speed is 7:1. In the exemplary embodiment, a 100 minute movie may be encoded at 250 Mb/s, consuming 3.75 GB of disk space, and may be played back at 5 Mbs, a typical rate for driving a real-time video stream. A conventional disk drive using one read head and one write head would have a ratio of write speed to read speed for the exemplary embodiment of 50:1, creating a flying height above the acceptable limit. By using 10 write heads, rather than one write head, the ratio of write speed to read speed of the exemplary embodiment is reduced from 50:1 to an acceptable 5:1.

FIG. 2 illustrates an exemplary embodiment of a read/write head assembly 106 comprising one read head and multiple write heads. The read/write head assembly 106 is configured with one read head 202, and multiple write heads 204a–204n, where n is the number of write heads necessary to create an acceptable ratio of write speed to read speed for the operational flying height of the head assembly 106.

Figure 3:
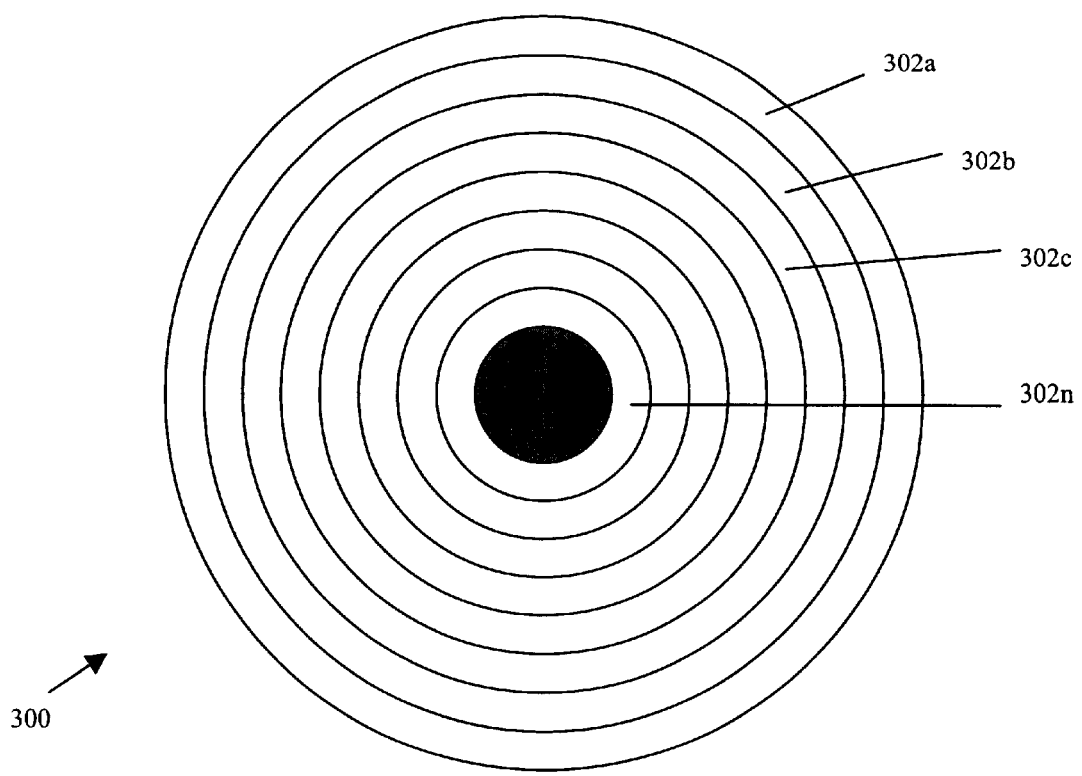
FIG. 3 illustrates an exemplary embodiment of tracks of a disk that could be accessed by the read/write head detailed in FIG. 2.

FIG. 3 illustrates an exemplary embodiment of concentric tracks 302 of a disk 300 that could be accessed by the read/write head assembly 106 detailed in FIG. 2. Conventionally, track-to track spacing on disk drives is sub-micron. Submicron track spacing causes difficulty in spacing write heads 204a–204n at such close distances. In the exemplary embodiment, it is not necessary that the write heads be positioned to write adjacent tracks. Rather, the write heads may be spaced apart by a multiple of the track spacing. In the exemplary embodiment, the multiple write heads may be positioned 10 track widths apart. In the exemplary embodiment, the head assembly 106 would be capable of writing tracks 1, 11, 21, 31, 41, 51, 61, 71, 81, and 91 simultaneously.

Each track on a disk is traditionally divided into sectors. Write operations are typically directed to specific physical sectors because adjacent physical sectors normally contain computer application data which must not be disturbed. Large multi-media data objects are not restricted to write operations directed to adjacent physical sectors. When storing multi-media data objects, such as movies, writing can be directed to complete tracks. Because the entire track will be written, writing can commence as soon as the position of the head assembly 106 has stabilized over the desired track 302. In other words, it is not necessary to wait for the disk 108 to rotate to a desired sector before beginning a write operation. Optimizing write operations by writing entire tracks can be implemented for individual heads 204, or for the multiple write heads 204a–204n as a group, One skilled in the art would understand that the same principals applied to the concentric tracks 302 of the exemplary embodiment could be implemented using spiral tracks, or other disk formats.

Multi-media object data may be formatted at the time of writing for parallel writing by the multiple write heads 204. The data may also be formatted at the time of reading to reorder the data from simultaneously written tracks.

During write operations, it is necessary to use the read head 202 to provide head assembly 106 position feedback. The read head 202 senses formatting indicators on the disk 108. The format indication signals received by the read head 202 are used to keep the head assembly 106 positioned over the appropriate tracks 302. The read head 202 of the exemplary embodiment will perform this function. The signal level from a magnetoresistive head is a function of flying height and temperature, rather than a function of the speed at which the magnetic disk surface 108 passes under the head 202. The read head 202 of the exemplary embodiment is a magnetoresistive head because its electrical signal level is not a function of disk speed. Because the flying height will likely be somewhat higher at the faster write speed, the received signal from the read head 202 is expected to have a lower signal level during write mode. Additional read head 202 gain can be provided by an electrical read amplifier contained in the Read/Write Electronics 110 if necessary. The natural redundancy of formatting indication marks allows the formatting information to be read successfully at a higher flying height even though the signal may be lower during write operations than during read operations.

Figure 4:
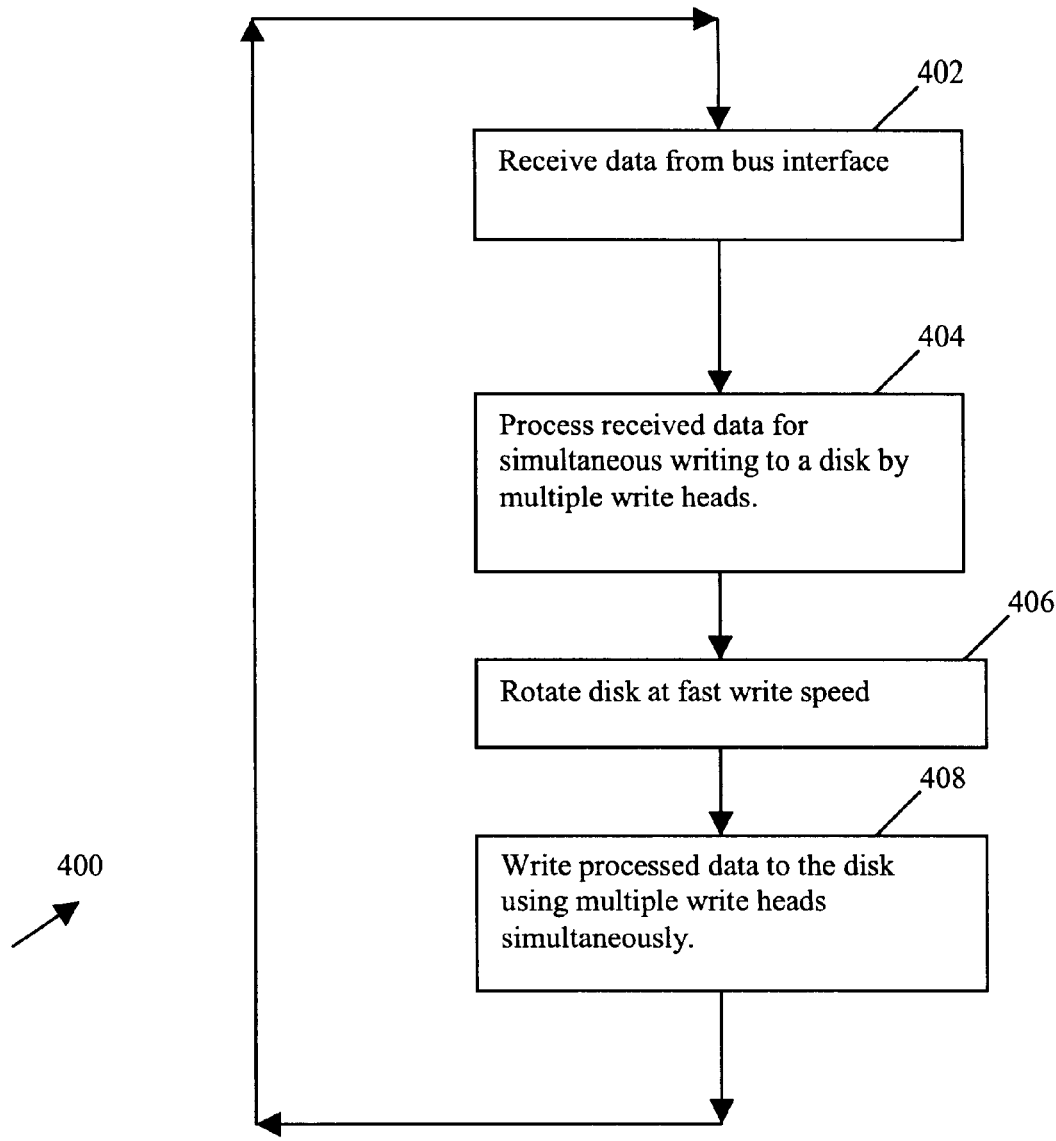
FIG. 4 is a flow chart illustrating write access steps for a variable mode multi-media data object storage device.

FIG. 4 is a flowchart 400 illustrating steps of multi-media data object storage in accordance with an exemplary embodiment.

Beginning in step 402, multi-media object data is received from a data Bus Interface 116. The received data may optionally be buffered. Control flow proceeds to step 404.

In step 404, the received data is processed for simultaneous writing to a disk by multiple write heads. The data may be divided into a number of parts equal to the number of write heads used, or otherwise suitably formatted for writing by multiple write heads. Control flow proceeds to step 406.

In step 406, the disk is rotated at the fast write speed. Control flow proceeds to step 408.

In step 408, the processed data is written to the disk using multiple write heads simultaneously.

Steps 402–408 are repeated until an entire multi-media data object has been stored. One skilled in the art will understand that the ordering of the steps illustrated in FIG. 4 is not limiting. The method is readily amended by omission or re-ordering of the steps illustrated without departing from the scope of the disclosed embodiments.

Figure 5:
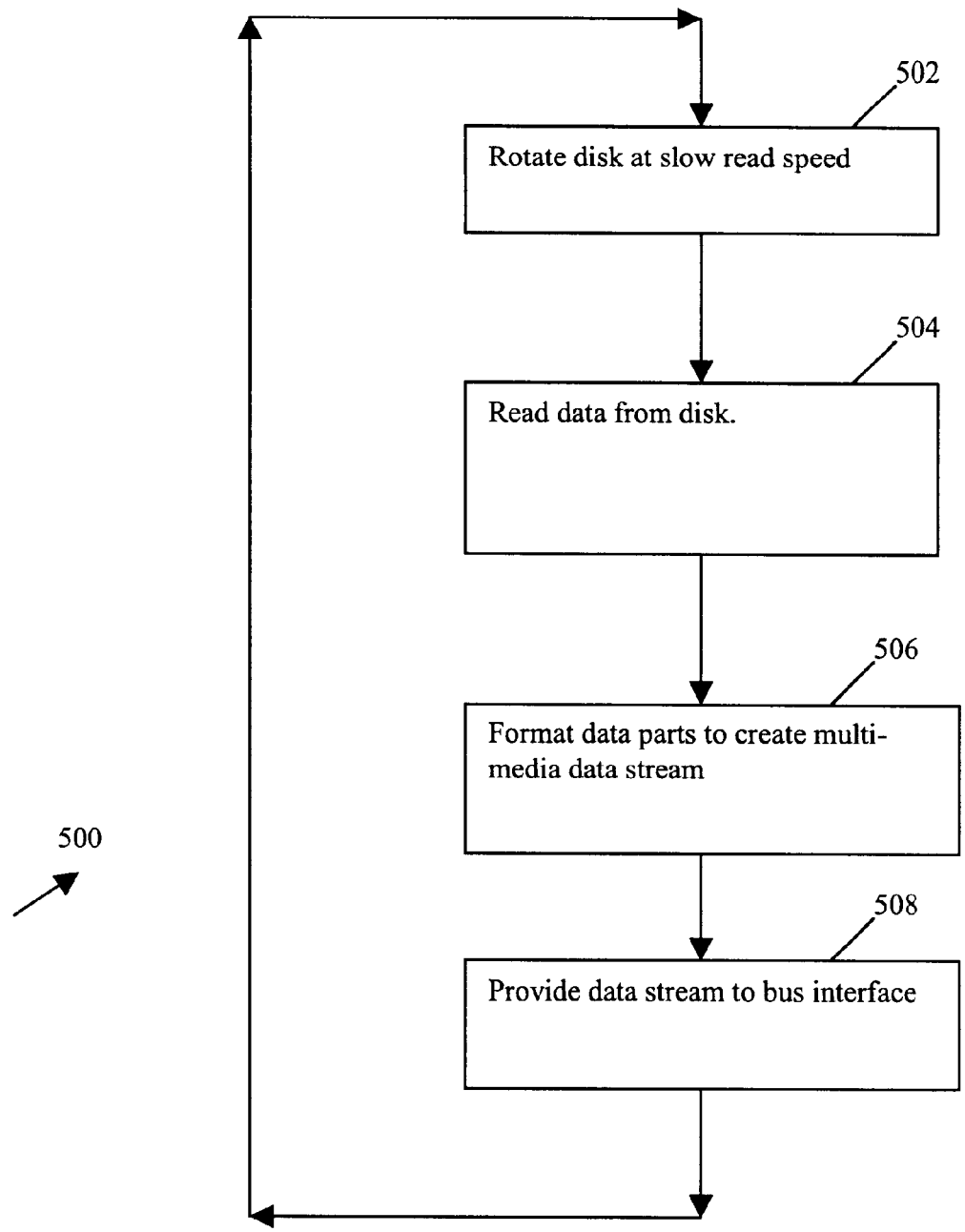
FIG. 5 is a flow chart illustrating read access steps for a variable mode multi-media data object storage device.

FIG. 5 is a flowchart 500 illustrating steps of multi-media data object retrieval in accordance with an exemplary embodiment.

Beginning in step 502, the disk is rotated at a slow read speed. Control flow proceeds to step 504.

In step 504, data is read from the disk. A number of data parts equal to the number of write heads used when the data was stored may be read from the disk. Read access may also be controlled by another scheme for retrieving data written by multiple write heads. Control flow proceeds to step 506.

In step 506, the data is formatted to create a multi-media data stream. Control flow proceeds to step 508.

In step 508, the multi-media data stream is provided to a Bus Interface 116 for output to a user device.

Steps 502–508 are repeated until an entire multi-media data object has been retrieved. One skilled in the art will understand that the ordering of the steps illustrated in FIG. 5 is not limiting. The method is readily amended by omission or re-ordering of the steps illustrated without departing from the scope of the disclosed embodiments.

Thus, a novel and improved method and apparatus for a variable mode multi-media data object storage device have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user device. A user device may be a fixed or portable multi-media playback or utilization device. In the alternative, the processor and the storage medium may reside as discrete components in a user device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A storage device using a plurality of write heads receiving input data from a buffer, the storage device comprising:
    a disk drive configured to operate at either a first rotation speed or a second rotation speed; and
    a processor coupled to the disk drive and configured to control the disk drive to operate at either the first rotation speed or the second rotation speed and the processor further configured to divide the input data into a number of parts equal to the number of the plurality of write heads.

2. The storage device of claim 1, wherein the disk drive comprises a head assembly including one read head and a plurality of write heads.

3. A disk drive for storing multi-media data objects, comprising:
    a magnetic disk;
    at least one individually selectable disk speed for reading;
    at least one individually selectable disk speed for writing, wherein the disk speed for writing is faster than the disk speed for reading;
    a plurality of write heads for writing multi-media object data to the disk; and
    one read head for reading multi-media object data from the and
    a control microprocessor for dividing the object data into a number of parts equal to the number of the plurality of write heads.

4. The disk drive of claim 3 wherein the disk speed is selected by control microprocessor.

5. The disk drive of claim 3 wherein the disk speed for reading is about 1000 revolutions per minute.

6. The disk drive of claim 3 wherein the disk speed for writing is about 7000 revolutions per minute.

7. The disk drive of claim 3 wherein the magnetic disk is formatted with concentric tracks.

8. The disk drive of claim 7 wherein the write heads are spaced apart by a multiple of the concentric track spacing.

9. The disk drive of claim 7 wherein the writing of data is directed to complete tracks.

10. The disk drive of claim 7 wherein the writing of data commences as soon as the position of the write heads has stabilized over desired tracks.

11. A variable mode disk drive for storing multi-media data objects operating at a first read speed and at a second write speed, comprising:
    a bus interface for providing input data to a buffer while the disk drive operates in a write mode, and for transferring output data from the buffer while the disk drive operates in a read mode;
    a slider mechanism for positioning one read head and a plurality of write heads over a magnetic disk;
    read and write electronics for processing data for transfer to and from the magnetic disk; and
    a processor for controlling the rotation speed of the magnetic disk and the processor further dividing the input data into a number of parts equal to the number of the plurality of write heads.

12. The disk drive of claim 11 wherein the bus interface is a Personal Computer Memory Card International Association bus interface.

13. The disk drive of claim 11 wherein the bus interface is an Advanced Technology bus interface.

14. The disk drive of claim 11 wherein the bus interface is a Small Computer System Interface bus interface.

15. The disk drive of claim 11 wherein the bus interface is a Universal Serial Bus bus interface.

16. The disk drive of claim 11 wherein the bus interface is an Interactive Services Association bus interface.

17. The disk drive of claim 11 wherein the bus interface is a Firewire bus interface.

18. The disk drive of claim 11 wherein the bus interface is a Peripheral Component Interconnect bus interface.

19. The disk drive of claim 11 wherein the read and write electronics format input data for simultaneous writing to the magnetic disk by multiple write heads during write mode.

20. The disk drive of claim 11 wherein the read and write electronics format output data to create a multi-media stream.

21. The disk drive of claim 11 wherein the magnetic disk has a capacity of 1 Gigibyte to 10 Gigibytes.

22. A method for storing data on a disk drive having a plurality of write heads, comprising:
    configuring the disk drive to operate at a first rotation speed for reading;
    configuring the disk drive to operate at a second rotation speed for writing, wherein the rotation speed for writing is faster than the rotation speed for reading;
    configuring the disk drive to receive input data; and
    configuring the disk drive to divide the input data into a number of parts equal to the number of the write head used.

23. The method of claim 22 wherein the disk speed is selected by a control microprocessor.

24. The method of claim 22 wherein the disk speed for reading is about 1000 revolutions per minute.

25. The method of claim 22 wherein the disk speed for writing is about 7000 revolutions per minute.

26. The method of claim 22 wherein the disk drive has a capacity of 1 Gigibyte to 10 Gigibytes.

27. A method for storing data to a disk drive having at least one disk speed for reading and at least one disk speed for writing, wherein the speed for writing is faster than the speed for reading, comprising:

receiving data from a bus interface;

processing the received data for simultaneous writing to the disk by a plurality of write heads, wherein processing the received data comprises dividing the data into a number of parts equal to the number of the plurality of write heads;

rotating the disk drive at the faster speed for writing; and writing the processed data to the disk by simultaneously using plurality of write heads.

28. The method of claim 27 wherein the disk speed is selected by a control microprocessor.

29. The method of claim 27 wherein the disk speed for reading is about 1000 revolutions per minute.

30. The method of claim 27 wherein the disk speed for writing is about 7000 revolutions per minute.

31. The method of claim 27 wherein the disk drive is formatted with concentric tracks.

32. The method of claim 27 wherein the plurality of write heads are spaced apart by a multiple of the concentric track spacing.

33. The method of claim 27 wherein the writing of data is directed to complete tracks.

34. The method of claim 27 wherein the writing of data commences as soon as the position of the write heads has stabilized over desired tracks.

35. The method of claim 27 wherein the disk drive has a capacity of 1 Gigibyte to 10 Gigibytes.

36. The method of claim 27 wherein the bus interface is a Personal Computer Memory Card International Association bus interface.

37. The method of claim 27 wherein the bus interface is an Advanced Technology bus interface.

38. The method of claim 27 wherein the bus interface is a Small Computer System Interface bus interface.

39. The method of claim 27 wherein the bus interface is a Universal Serial Bus bus interface.

40. The method of claim 27 wherein the bus interface is an Interactive Services Association bus interface.

41. The method of claim 27 wherein the bus interface is a Firewire bus interface.

42. The method of claim 27 wherein the bus interface is a Peripheral Component Interconnect bus interface.

43. A method for retrieving data from a disk drive having at least one disk speed for reading and at least one disk speed for writing, wherein the speed for writing is faster than the speed for reading, comprising:

rotating the disk drive at the slower speed for reading;

reading data from the disk drive;

processing the data to create a multi-media data stream; and providing the data stream to a bus interface; and dividing the data stream into a number of parts equal to the number of write heads used.

44. The method of claim 43 wherein the disk speed is selected by a control microprocessor.

45. The method of claim 43 wherein the disk speed for reading is about 1000 revolutions per minute.

46. The method of claim 43 wherein the disk speed for writing is about 7000 revolutions per minute.

47. The method of claim 43 wherein the disk drive is formatted with concentric tracks.

48. The method of claim 43 wherein the disk drive has a capacity of 1 Gigibyte to 10 Gigibytes.

49. The method of claim 43 wherein the bus interface is a Personal Computer Memory Card International Association bus interface.

50. The method of claim 43 wherein the bus interface is an Advanced Technology bus interface.

51. The method of claim 43 wherein the bus interface is a Small Computer System Interface bus interface.

52. The method of claim 43 wherein the bus interface is a Universal Serial Bus bus interface.

53. The method of claim 43 wherein the bus interface is an Interactive Services Association bus interface.

54. The method of claim 43 wherein the bus interface is a Firewire bus interface.

55. The method of claim 43 wherein the bus interface is a Peripheral Component Interconnect bus interface.

56. A storage device, comprising:

a disk drive having a read head and a plurality of write heads and configured to operate at a plurality of rotation speeds; and a processor, coupled the disk drive, configured to receive input data and dividing the received input data into a number of parts equal to the number of the write heads used; the processor further configured to write the processed data simultaneously using the plurality of write heads.

57. A storage device of claim 56, wherein the plurality of rotation speeds comprises a first rotation speed and second rotation speed, wherein ratio of first rotation speed to second rotation speed is 7 to 1.

58. A storage device of claim 56, wherein the write heads are spaced apart by a multiple of track spacing.

59. A storage device of claim 56, wherein the plurality of write heads for writing multi-media object data to the disk, the multimedia object data may be formatted at the time of writing for parallel writing by the write heads.

60. A method for writing multi-media object data to a first device, method comprising:

rotating the first device at the fast speed for writing than for reading; reading the multi-media data from a read head;

writing the multi-media data to a plurality of write heads; and formatting the multi-media object data, based on the number of write heads used at the time parallel writing by the plurality of write heads.

61. A storage device, configured to operate a disk in a plurality of rotation speeds, the storage device having a read head and a plurality of write heads, the storage device, comprising:

a processor coupled the storage device and configured to process received data and dividing the received data into a number of parts equal to the number of the write heads used.

62. A storage device of claim 61, wherein the processor coupled to the disk drive and configured to control the disk drive to operate at either the first rotation speed or the second rotation speed.

63. A storage device of claim 61, wherein first rotation speed faster than the second rotation speed wherein ratio of first rotation speed to second rotation speed is 7 to 1.

* * * * *